United States Patent [19]

Möhrmann et al.

[11] Patent Number: 5,761,307
[45] Date of Patent: Jun. 2, 1998

[54] METHOD FOR SECURING DATA IN A TELECOMMUNICATIONS SYSTEM

[75] Inventors: Karl Heinz Möhrmann, München; Karl-Ulrich Stein, Unterhaching, both of Germany

[73] Assignee: Siemens Aktiengesellschaft, Munich, Germany

[21] Appl. No.: 817,183

[22] PCT Filed: Oct. 6, 1995

[86] PCT No.: PCT/DE95/01368

§ 371 Date: Apr. 7, 1997

§ 102(e) Date: Apr. 7, 1997

[87] PCT Pub. No.: WO96/11540

PCT Pub. Date: Apr. 18, 1996

[30] Foreign Application Priority Data

Oct. 7, 1994 [DE] Germany .................. 44 35 901.2

[51] Int. Cl.⁶ .................. H04L 9/08; H04L 9/00; H04L 9/30
[52] U.S. Cl. .................. 380/21; 380/30; 380/49
[58] Field of Search .................. 380/9, 21, 30, 380/44, 46, 49, 50, 59

[56] References Cited

U.S. PATENT DOCUMENTS

| | | | |
|---|---|---|---|
| 5,144,665 | 9/1992 | Takaragi et al. | 380/30 |
| 5,159,633 | 10/1992 | Nakamura | 380/30 |
| 5,371,794 | 12/1994 | Diffie et al. | 380/21 |
| 5,663,896 | 9/1997 | Aucsmith | 380/30 X |

FOREIGN PATENT DOCUMENTS

| | | |
|---|---|---|
| 0171080B1 | 8/1985 | European Pat. Off. . |
| 0460398 A1 | 2/1991 | European Pat. Off. . |
| 0411597 A2 | 6/1991 | European Pat. Off. . |
| 42 94 461 C1 | 7/1993 | Germany . |

OTHER PUBLICATIONS

Patent Abstracts of Japan, vol. 017, No. 646, (E–1467), 30 Nov. 1993 & JP–A–05207466.

International Journal of Digital and Analog Communication Systems, vol. 6, 143–149 (1993), H. Keller et al, pp. 143–149.

Inspec–An—Passive Fibre Local Loop For Telephony With roadband Upgrade, 1988 IEEE–K A Oakley et al, pp. 0179–0183.

ntz Bd. 38 (1985)—Kryptografie in der Telematik, pp. 636–638.

Bild 11.2 Systemüberblick über das Konzept von Opal 4, p. 11, No Date.

Telephony/Nov. 1, 1993—Time Warner's magic kingdom, Richard Karpinski, pp. 48–53.

Br Telecom Technol J. vol. 7 No. 2 Apr. 1989. The provision of telephony over passive optical networks, C E Hoppitt et al, pp. 100–113.

*Primary Examiner*—Bernarr E. Gregory
*Attorney, Agent, or Firm*—Hill & Simpson

[57] ABSTRACT

A subscriber network is operated bidirectionally and has one or more coaxial line tree networks which are shared in each case by a plurality of subscriber-end network termination units and extend between such subscriber-end network termination units and has a higher level connection unit. The coaxial line tree network or networks can be connected in each case, via a converter device, to an optical waveguide, preferably of an optical waveguide tree network, containing optical splitters, and can be connected via said optical waveguide or waveguides to the associated connection unit, for the purposes of securing data. The public key is determined in each case from a secret key prescribed in the subscriber-end network termination unit. The public key is upwardly transferred to the connection unit where it is used to encrypt (secondary key) information in order to match the subscriber-end network termination unit to repeatedly changed transmission modalities provided individually for this subscriber-end network termination unit in the connection unit.

8 Claims, 1 Drawing Sheet

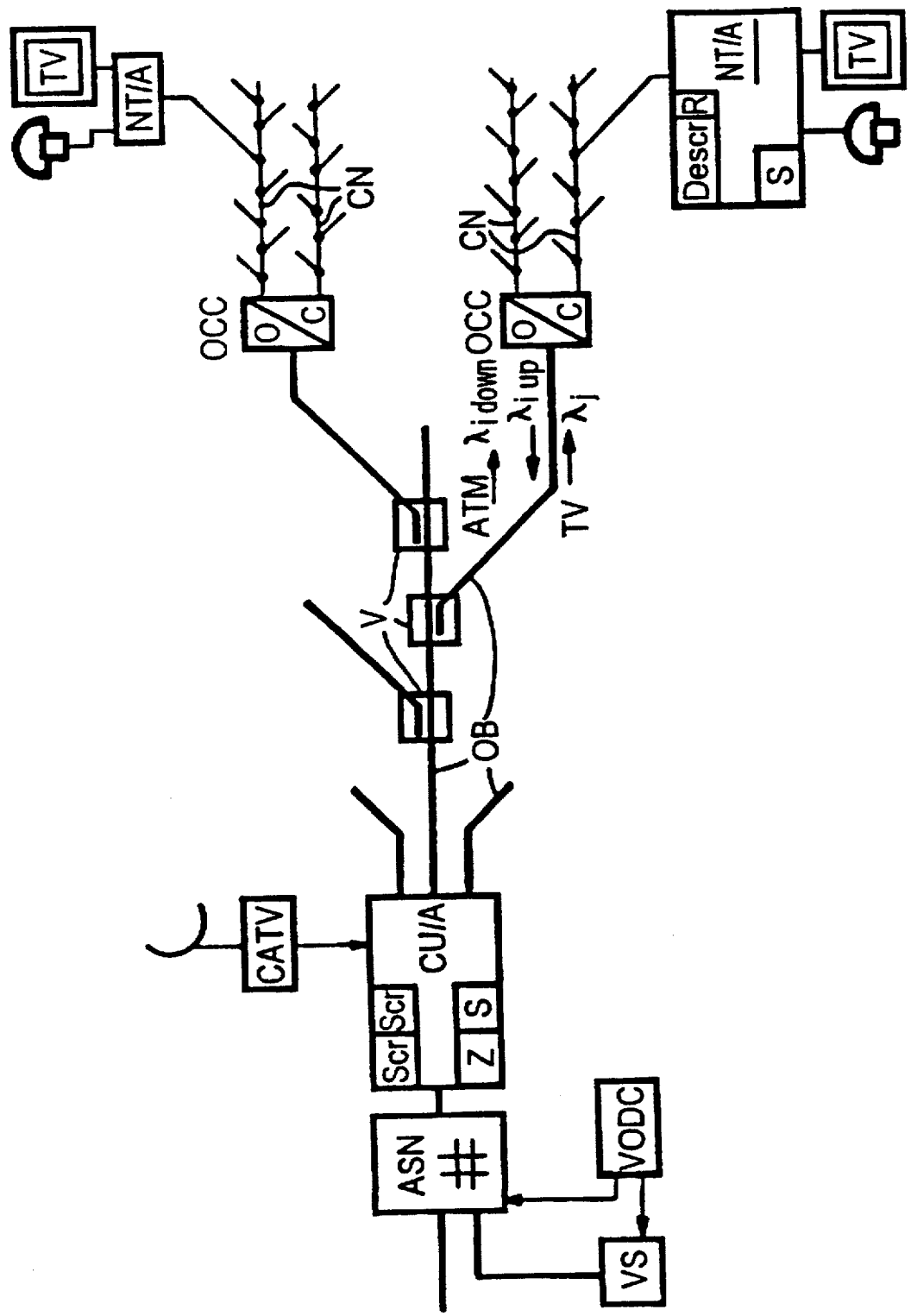

METHOD FOR SECURING DATA IN A TELECOMMUNICATIONS SYSTEM

BACKGROUND OF THE INVENTION

Relatively recent developments in telecommunications technology are giving rise, at the level of subscriber lines, to passive optical telecommunications systems in which in each case a plurality of decentralized devices (subscriber stations or so-called distant units combining in each case a plurality of subscriber stations) is connected in each case via a separate optical waveguide subscriber line to an optical splitter which is connected directly or via at least one further optical splitter to a common optical waveguide connection of a central device—realized in particular by means of a switching center—via an optical waveguide bus (EP-A-0 171 080; ISSLS '88, Conf. Papers 9.4.1 . . . 5; BR Telecom Technol. J. 17(1989)2, 100 . . . 113).

In such a passive optical telecommunications network, the transmission of signals from the central device "downstream" to the decentralized devices can proceed in a TDM cell stream from which each decentralized device only receives the cells intended for this particular decentralized device, and the transmission of signals from the decentralized devices "upstream" to the central device can proceed using a TDMA method, according to which a decentralized device emits each burst synchronized with the aid of a delay device which is set in a device-specific way from the central device (EP-A-0 460 398). The downstream transmission of signals from the central device to the decentralized devices and the upstream transmission of signals from the decentralized devices to the central device can also proceed in this context in one and the same wavelength window (for example using equal band mode at 1.3 µm).

The introduction of new broadband communication services depends quite generally on the type and scope of the already existing telecommunications infrastructures with the telecommunications services made available in them and on the demand for broadband telecommunications possibilities. In this context, potentially the greatest connection volume is considered to be in private households; however, this connection potential cannot be translated into effective demand for connections without the cost of a broadband subscriber connection being appropriately low.

Various connection possibilities are currently being discussed in order to permit a subscriber to use broadband ISDN services (examples of this are interactive video on demand (VoD), teleshopping, information searching, and also narrowband services such as (N-)ISDN or conventional telephone services (POTS)). Solutions in which already existing infrastructure can be used are particularly attractive. For example the coaxial cable networks of CATV providers constitute an appropriate medium: the frequency range of for example 50–450 MHz (in Germany) is used by conventional analog signal television channels; the range below and above the analog signal television distribution has hitherto been free and can be used for new services. In the USA part of the range which has been free hitherto is used for so-called cablephone by a number of cable TV companies. Other operators are considering a more comprehensive system which provides a large part of the abovementioned services within the scope of an access network, for example on an ATM basis, it being usually possible, because of the limited range, to connect a fiber optic feeder upstream of the coaxial subnetworks (TELEPHONY, 01.11.93, 48 . . . 53). In addition to a passive optical network (PON) with expansion by means of a coaxial line tree network for unidirectional distributive communication (TV), a further passive optical network (PON) has already been used for bidirectional interactive switched telecommunications (Der Fermeldeingenieur [The Telecommunications Engineer] 46(1992)10, FIG. 11.2 System OPAL 4). In a particularly advantageous configuration of a subscriber network, the coaxial line tree networks are connected, in each case by a converter device, to an optical waveguide tree network, containing optical splitters, for both bidirectional telecommunications services, preferably in transposed band mode, and unidirectional distributive communications services (DE-P 44 06 509.4); this permits a large number of subscribers to be provided very economically both with distributive communications services and with interactive switched telecommunications services. In this context, the optical waveguide tree network may be a passive optical network or an active optical network provided with amplifiers; independently of the above, and of one another, the individual coaxial line tree networks may be amplifier-free passive coaxial line tree networks or active ones provided with amplifiers. This flexibility permits even networks with entirely different ranges to be realized.

In optical double star networks which are formed with passive fiber optic couplers and in which each decentralized telecommunications device receives the downstream information emitted by the central telecommunications device and extracts from the said information only the information intended for it in order to pass it on to the connected subscriber or subscribers, it is possible in principle to access information which is intended for other subscribers which are connected to other decentralized telecommunications devices. Effective safeguarding of a passive optical telecommunications system against unauthorized access to the digital signals transmitted therein is provided by a method (known from DE-C1-42 04 461) for securing data in a telecommunications system with a central telecommunications device and a plurality of decentralized telecommunications devices which are each connected via a separate optical waveguide subscriber line to an optical splitter which is connected directly or via at least one further optical splitter to a common optical waveguide connection of the central telecommunications device via an optical waveguide bus, the transmission of signals from the central telecommunications device to the decentralized devices proceeding in a multiplex frame or in an ATM cell stream, and the transmission of signals from the decentralized telecommunications devices to the central device proceeding in each case in a time slot, assigned to the respective decentralized device, of the multiplex frame, the transmission proceeding preferably with adaptive control of the timing of the time slot using a TDMA method or by means of ATM cells using a TDMA method; as a result of this method, a public key is determined from a secret key prescribed in a decentralized telecommunications device, said public key being upwardly transferred to the central telecommunications device where it is used to encrypt (secondary key) information in order to match the decentralized device to repeatedly changed transmission modalities provided individually for this decentralized device in the central device.

However, the problem of unauthorized access to digital signals transmitted in a telecommunications system arises not only in passive optical networks (PON) of the type outlined above but also in other point-to-multipoint networks, and this problem can also be dealt with in such networks in accordance with the known (from DE-C1-42 04 461) method principle. For example, in particular also in a (preferably cellular) radio network with a plurality of radio subscribers and at least one base station, for securing data a public key can be determined in each case from a secret key prescribed on the part of the subscriber, said public key being upwardly transferred to the base station where it is used to encrypt (secondary key) information in order to match the radio subscriber to repeatedly changed transmission modalities provided individually for this radio subscriber in the base station.

SUMMARY OF THE INVENTION

The invention indicates a way of effectively securing telecommunications traffic against unauthorized access to the digital signals transmitted therein in a subscriber network which can be operated bidirectionally and has one or more coaxial line tree networks which are shared in each case by a plurality of subscriber-end network termination units and extend between such subscriber-end network termination units and a higher level connection unit. The invention relates to a method for securing data in a telecommunications system with a plurality of decentralized telecommunications devices and a telecommunications device which is central with respect thereto, in accordance with which a public key is determined from a secret key prescribed in a decentralized telecommunications device, said public key being upwardly transferred to the central telecommunications device where it is used to encrypt (secondary key) information in order to match the decentralized device to repeatedly changed transmission modalities provided individually for this decentralized device in the central device. This method is characterized in that,

- in a subscriber network which can be operated bidirectionally and has one or more coaxial line tree networks which are shared in each case by a plurality of subscriber-end network termination units and extend between such subscriber-end network termination units and a higher level connection unit,
- in which said coaxial line tree network or networks can be connected, in each case via a converter device, to an optical waveguide (OB), preferably of an optical waveguide tree network, containing optical splitters, and
- can be connected via said optical waveguide or waveguides to the associated connection unit,
- and in which the transmission of signals from the associated connection unit to the subscriber-end network termination units proceeds in a multiplex frame or in an ATM cell stream and the transmission of signals from the subscriber-end network termination units to the associated connection unit proceeds in each case in a time slot, assigned to the respective subscriber-end network termination unit, of the multiplex frame, this transmission proceeding preferably with adaptive control of the timing of the time slot using a TDMA method or by means of ATM cells using a TDMA method,
- for securing data, the public key is determined in each case from a secret key prescribed in the subscriber-end network termination unit, said public key being upwardly transferred to the connection unit where it is used to encrypt (secondary key) information in order to match the subscriber-end network termination unit to repeatedly changed transmission modalities provided individually for this subscriber-end network termination unit in the connection unit.

The invention provides the advantage of being able to dispense with an exchange of secret keys and nevertheless ensure a high degree of security of the digital signals, transmitted from the connection unit downstream to the subscriber-end network termination devices, against unauthorized access and monitoring even if the connections have existed for a relatively long time (in particular dedicated lines) or else are asymmetric connections with different data rates in the two transmission directions. The necessary computational outlay for a public key method is in principle high, but since the encrypted communication of new transmission modalities is necessary only occasionally, namely in conjunction with a change in such modalities carried out by the connection unit at specific time intervals, the timing of the calculation of the key and of the encryption is not critical so that it can be carried out offline by software means using a relatively simple arithmetic unit.

For the actual securing of the continuous digital signal stream, in a further refinement of the invention, the assignment of the time slots to the individual subscriber-end network termination units can be repeatedly changed within the scope of the TDM downstream signal in that the higher level connection unit determines, by means of a random number generator, a random new time slot assignment for the individual subscriber-end network termination units and communicates the timing of the time slot or slots assigned to one of the network termination units, having been encrypted using a public key transferred by the respective subscriber-end network termination unit, to the respective subscriber-end network termination unit which decrypts this communication with the associated secret key, after which the change is carried out starting from one specific multiplex frame.

In order to improve further data security against an attack on the secret key, which can in principle not be excluded with an appropriately high computational outlay, in a further refinement of the invention the subscriber-end network termination unit can transfer, after a specific number of multiplex frames, a new public key, which has been calculated by said network termination unit, to the higher level connection unit, which itself, after a new time slot assignment to the subscriber-end network termination units has been determined and the respective time slot position has been encrypted again, in turn individually communicates to each subscriber-end network termination unit the reordering of the time slot assignment, which is then carried out starting from a specific multiplex frame.

According to another refinement of the invention, the initial position and/or the structure of scramblers which are provided in the higher level connection unit and are assigned to the individual subscriber-end network termination units and of descramblers, which are provided in the subscriber-end network termination units, can be repeatedly changed at the start of a frame in that the higher level connection unit determines, by means of a random number generator, in each case a random new initial position and/or structure for the scramblers assigned to the individual subscriber-end network termination units and communicates the associated initial position and/or structure of the associated descrambler, having been encrypted using a public key transferred by the respective subscriber-end network termination unit, to the respective subscriber-end network termination unit which decrypts this communication using the associated secret key, after which the change is carried out starting from a specific frame.

This modification which can also be restricted to individual decentralized telecommunications devices with subscribers which are in particular need of security, can also be used in the transmission of ATM cells: The useful signal which is contained in the cell is scrambled in the connection unit and only the network termination unit forming the destination of the ATM cell knows how to descramble the signal since the initial position necessary at the start of the useful information part (payload) of the cell, and if appropriate also the structure of the scrambler, has been communicated in an encrypted form which only it can understand. In order to further improve data security against an attack on the secret key, in a further refinement of the invention, the subscriber-end network termination unit can, after a specific number of frames, transfer a new public key, calculated by said network termination unit, to the higher level connection unit which itself, after a new scrambler initial position and/or structure has been determined and the respectively associated descrambler initial position and/or structure has been encrypted again, in turn individually communicates to each subscriber-end network termination unit the change in the initial position and/or structure which is then carried out starting from a specific frame.

According to another refinement of the invention, the assignment of addresses to the individual subscriber-end network termination units can be repeatedly changed in that the higher level connection unit determines, by means of a random number generator, a random new address assignment for the individual subscriber-end network termination units and communicates the respective new address information, having been encrypted using a public key transferred by the respective subscriber-end network termination unit, to the respective subscriber-end network termination unit which decrypts this communication using the associated secret key, after which the change is taken into account starting from a specific multiplex frame.

In this context, the subscriber-end network termination unit can transfer, after a specific number of multiplex frames, a new public key, calculated by said network termination unit, to the higher level connection unit which itself, after a new address assignment to the subscriber-end network termination units has been determined and the respective address information has been encrypted again, in turn individually communicates to each subscriber-end network termination unit the reordering of the address assignment which is then taken into account starting from a specific multiplex frame.

There is no need whatsoever for all these method procedures—which can generally be used in point-to-multipoint networks—to proceed simultaneously for all the decentralized devices; instead, it is sufficient that, in a further refinement of the invention, the transmission modalities for various subscriber-end network termination units or groups of subscriber-end network termination units are changed at various times, which is a further impediment on an intervention.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

The single FIGURE provides a schematic view, to an extent which is necessary for comprehension of the invention, of a subscriber network which can be operated bidirectionally. In this context, coaxial line networks CN are shown in the right hand part of the drawing in the customary tree structure in which they are usually already laid.

DESCRIPTION OF THE PREFERRED EMBODIMENTS

At the subscriber end (see the single FIGURE), the coaxial lines are terminated, in each case with a network termination device NT/A which would be capable of converting its reception and transmission signals in each case in such a way that the connection of customary terminals is possible; a network termination device NT/A has for example ports for cable television and video on demand, for conventional telephone services (POTS) and/or narrowband ISDN or even for any broadband ISDN service.

At the end remote from the subscriber, the coaxial line networks CN are connected in each case via an optical/coaxial converter device OCC to an optical subscriber line of an optical waveguide network OB which is branched using optical splitters V and which connects the coaxial line networks to a connection unit CU/A preferably formed with a (ATM) cross connect. A plurality of such optical waveguide networks OB can be connected to such a connection unit CU/A, as is also indicated in the drawing; in a corresponding way, as is likewise indicated in the drawing a plurality, for example up to four, coaxial line subnetworks CN can be connected to a converter device OCC. If a coaxial line network CN permits for example 100 subscribers to be connected, the converter device OCC serves 400 subscribers and the connection unit CU/A serves for example 2000 to 4000 subscribers.

The transmission in the subscriber network can also proceed according to the synchronous transfer mode STM or on the basis of ATM cells (cell-based) with a system-specific overhead. In this context, the data rate, at for example 622 Mbit/s will be higher in the transmission direction to the subscriber (downstream) than the data rate in the opposite transmission direction (upstream) at for example 155 Mbits/s, in which case, in terms of transmission technology, the downstream transmission can proceed in a plurality of channels (for example in four channels at 155 Mbit/s each).

In the system outlined in the drawing, analog TV cable signals are fed in from a CATV head end into the connection unit CU/A which is shared by the connected subscribers, and said signals are transmitted to all the connected subscribers. These television signals can be received in a customary way at the subscriber's premises by a television receiver which is connected to the subscriber's network termination device NT/A and is indicated in the drawing by TV.

It will be assumed that, in addition to the analog TV signals, digital signals in the ATM format are fed to the connection unit CU/A in the telecommunications system outlined in the drawing. Such signals can be for example digital video signals of a video on demand service (also including an ATM reverse channel for program selection by the TV subscriber) or else broadband interactive data signals, the digital video signals being likewise received by the television receiver TV by means of an appropriate add-on device (set top box) (not illustrated specifically in the drawing).

Furthermore, narrowband ATM voice and, if appropriate, also data signals can be transmitted in both directions in the system outlined in the drawing, which is indicated in the drawing by a telephone connected to the network termination device NT/A. Further services which can require the connection of further terminals to the respective network termination device NT/A are possible without the need to illustrate this in the drawing.

The ATM signals are fed through an ATM switching device ASN. For video on demand in this context, it is necessary to have a video server VS in which the video programs (films) to be called up are stored, to be precise usually in digital and data-compressed form, for example in accordance with the MPEG2 algorithm, produced by ISO MPEG, at for example 4 Mbit/s. It would be assumed that the server VS is controlled by a controller VODC which evaluates signaling information coming from the connected subscribers via the respective reverse channel, and controls appropriately both the outputting of programs from the video server VS and the ATM coupling device ASN.

The general use of the asynchronous transfer mode (ATM) for the digital signals of all the services (with the exception of the TV distribution service which is based on analog signal transmission) is extraordinarily advantageous owing to its high flexibility. Signals with any desired, different data rates may be mixed as desired; a selection of data rates in accordance with specific hierarchy levels is superfluous. This is very interesting in particular also for video transmission since, on the one hand, a generally agreed data rate for a video signal does not in any case exist and, on the other hand, different levels of image quality can be provided by selecting different data rates.

The access of the subscribers (NT/A) to the network is subject to a TDMA access procedure; such TDMA access procedures are known (for example from Intern. J. of Digital and Analog Communication Systems, 6 (1993), 143 ... 149) and do not need to be explained further here, especially since this is not necessary for comprehension of the invention. The access procedure for TDMA access to the network in the upstream direction can be effective for the entire subscriber network CN, OB. As an alternative to this, separate access procedures for TDMA access in the upstream direction are also possible for the optical waveguide tree network and individual coaxial line tree networks, access to the optical waveguide tree network being effected by the appropriately equipped, respective converter device OCC.

The separation of the interactive telecommunications services from the distribution services is usually effected by means of wavelength multiplexing; as is also indicated in the drawing, the signals of the interactive services are transferred at wavelengths $\lambda_{i\ down}$ and $\lambda_{i\ up}$ and those of the distribution services are transferred at wavelengths $\lambda_j$. In this context, the indices i and j indicate that the wavelength multiplexing principle can be applied not only for separating services but also, if appropriate, for increasing capacity. In this context, to each converter device there can be individually assigned one or more pairs of wavelengths.

In the exemplary embodiment outlined in the drawing the network termination units NT/A are each provided with a descrambler Descr which descrambles the digital signal which is intended for the respective network termination unit and has been scrambled in the associated connection unit CU/A. The connection unit CU/A has, for scrambling purposes, in each case a separate scrambler Scr, Scr, ... per network termination unit NT/A. The scramblers do not have to be realized using hardware but can also be realized by means of software, as can the descramblers, or by means of a single hardware structure which can be switched over. Scramblers and descramblers are repeatedly changed; for this purpose, the necessary initial position for the descrambler Descr is communicated to the network termination unit NT/A in each case at the correct time by the connection unit CU/A, having been encrypted using a so-called public key. For this purpose, the network termination units NT/A prescribe a secret key and determine a public key for it, which can be effected in each case using a computer R provided in the network termination units NT/A. Encrypted using the public key transmitted to the connection unit CU/A, the aforesaid information about the initial position of the descrambler Descr, to a certain extent as an item of secondary key information is sent by the connection unit CU/A; this information about the changed transmission modalities can be decrypted only with the secret key on which it is based, and thus only by that network termination unit NT/A for which the respective information is intended.

Public key methods are known per se (for example from ntz 38 (1985) 9, 636 ... 638; they use so-called one way functions to form keys. One way functions are functions whose function value can be calculated relatively easily while the calculation of the inverse values is virtually impossible. "Easily" and "virtually impossible" mean here the computational outlay and thus depend on the state of development of the respective generation of computers. (Jansen, Pohlmann: "Kryptographie in der Telematik [Cryptography in Telematics]", ntz 38 (1985) 9, 636 ... 638):

Thus, a known public key method is based for example on the fact that it is quite simple to calculate a large natural number by multiplying a number of primary numbers but that it is virtually impossible to decompose this large natural number back into its primary factors (Rivest, Shamir, Adleman: "A method for obtaining digital signatures and public-key cryptosystems", Communications of the ACM 21(1978) 2, 120 ... 126). In this so-called RSA method, a key text C is obtained from a plain text M by means of a mathematical transformation $$C = M^e \pmod{n}.$$

The inverse transformation with which the plain text is obtained again from the key text is as follows $$M = C^d \pmod{n}.$$

M is a positive integer which must lie between 0 and n−1. The following key pairs are then obtained:

(e,n) for the public key and (d,n) for the secret key.

In the calculation of the keys, n is initially calculated as a product of two very large, freely selected primary numbers p and q (these numbers are generated by means of a random number generator and remain secret):

$$n = p \cdot q,$$

where p is unequal to q.

Since conversely determining the primary numbers p and q from n leads to enormous difficulties, n may be disclosed as a component of the public key.

The secret key d used is a freely selected, large integer (approximately 100 place integer in serious applications) which has to be relatively prime in respect of (p−1)·(q−1). Once p, q and d have been determined in this way, the public key e can be generated by means of "inverse multiplication":

$$e \cdot d \ (\bmod(p-1) \cdot (q-1)) = 1.$$

There are special mathematical algorithms for generating primary numbers and keys. However, owing to the complex computational processes the possible throughput rate is low (several zig bit/s).

The initial position of the scramblers Scr which are provided in the connection unit CU/A and are assigned to the individual network termination units NT/A and of the descramblers Descr which are provided in the network termination units NT/A may be repeatedly changed in that the connection unit CU/A determines, by means of a random number generator Z, in each case a random new initial position for the scramblers Scr assigned to the individual network termination units NT/A, stores it in a table and communicates the respectively associated initial position of the associated descrambler Descr, having been encrypted using the public key, to the respective network termination unit NT/A; this communication can proceed by means of a simple protocol in a data channel in the TDM/TDMA overhead and/or in ATM cells intended for this. In the network termination unit NT/A the communication is decrypted using the associated secret key, after which the change is carried out starting from a specific frame.

The network termination unit NT/A can calculate new keys at specific time intervals and transfer the new public key calculated by it to the higher level connection unit CU/A; the connection unit CU/A can then, after determining a new scrambler initial position encrypt the associated descrambler initial position with the new public key and communicate the change in the initial position to the respective network termination unit NT/A, which initial position is then in turn carried out starting from a specific frame. Not only the initial setting but also the structure of the scrambler and descrambler can be changed at regular or irregular time intervals in order to impede unauthorized monitoring.

Another possible way of securing the subscriber network against unauthorized access to digital signals transmitted therein in multiplex frames consists for example in the assignment of the time slots to the individual network termination units NT/A in the downstream multiplex frame which is decisive for a TDM transmission of signals from the higher level connection unit CU/A to the network termination units NT/A being changed repeatedly: in this context, the connection unit CU/A determines, by means of a random number generator, a random new time slot assignment for the individual network termination units NT/A, stores it in a table and communicates the timing of the time slot or slots assigned to it, having been encrypted using the public key transferred by the respective network termination unit NT/A, to the respective network termination unit NT/A; this communication can in turn proceed by means of a simple protocol in a data channel in the TDM/TDMA overhead. In the network termination unit NT/A, the communication is decrypted using the associated secret key, after which the change is carried out starting from a specific multiplex frame.

Here too, the network termination unit NT/A can from time to time calculate new keys and transfer the new public key calculated by it to the connection unit CU/A which then, starting from the next change in the time slot assignment, communicates the respective new time slot, having been encrypted using the new public key, to the respective network termination unit NT/A. The network termination unit NT/A cannot access for a relatively long time a time slot which is not assigned to it, which makes unauthorized monitoring impossible.

Another possible way of securing the subscriber network against unauthorized access to digital signals transmitted therein in the form of ATM cells consists, for example, in the assignment of addresses to the individual subscriber-end network termination units NT/A being changed repeatedly: in this context, the higher level connection unit CU/A determines, by means of a random number generator, a random new address assignment for the individual subscriber-end network termination units NT/A, stores it in a table and communicates the respective new address information, having been encrypted using a public key transferred by the respective subscriber-end network termination unit NT/A, to the respective subscriber-end network termination unit NT/A, it being possible for this communication in turn to proceed in ATM cells intended for this purpose. In the network termination unit NT/A, the communication is decrypted using the associated secret key, after which the change is taken into account starting from a specific multiplex frame.

In turn, the subscriber-end network termination unit NT/A can transfer from time to time a new public key calculated by it to the higher level connection unit CU/A which itself, after a new address assignment to the subscriber-end network termination units NT/A has been determined and the respective address information has been encrypted again, in turn communicates individually to each subscriber-end network termination unit NT/A the reordering of the address assignment which is then taken into account starting from a specific multiplex frame.

At this point it is necessary to note in particular that the repeated change in the assignment of addresses to the individual subscribers is not tied to a subscriber network which can be operated bidirectionally and has one or more coaxial line tree networks which are shared in each case by a plurality of subscriber-end network termination units and extend between such subscriber-end network termination units and a higher level connection unit, but rather that, in quite general terms for securing data in a telecommunications system with a plurality of decentralized telecommunications devices and a telecommunications device which is central with respect thereto and in which the transmission of signals to the subscriber-end network termination units proceeds in an ATM cell stream, the assignment of addresses to the individual subscriber-end network termination units can also be changed repeatedly in that the higher level connection unit determines, by means of a random number generator, a random new address assignment for the individual subscriber-end network termination units and communicates the respective new address information, having been encrypted using a public key transferred by the respective subscriber-end network termination unit, to the respective subscriber-end network termination unit which decrypts this communication using the associated secret key, after which the change is taken into account starting from a specific multiplex frame.

The key devices S as such (indicated in the drawing in the connection unit CU/A and in the network termination units NT/A) can be realized in a manner known per se in the form of digital arithmetic units so that further explanations of this are not necessary at this point; the same applies also to the random number generator Z indicated in the connection unit CU/A.

What is claimed is:

1. A method for securing data in a telecommunications system with a plurality of decentralized telecommunications devices and a central telecommunications device, comprising the steps of:

determining a secret key in a decentralized telecommunications device;

determining a public key from the secret key prescribed in the decentralized telecommunications device, said public key being transferred to the central telecommunications device where the public key is used to encrypt information in order to match the decentralized device to repeatedly changed transmission modalities provided individually for this decentralized device in the central telecommunications device;

bidirectionally operating a subscriber network which has at least one coaxial line tree network which is respectively shared by a plurality of subscriber-end network termination units and which extends between such subscriber-end network termination units and a higher level connection unit;

connecting said at least one coaxial line tree network via a converter device to an optical waveguide of an optical waveguide tree network, containing optical splitters, and via said optical waveguide to the associated connection unit;

transmitting signals from the associated connection unit to the subscriber-end network termination units in a multiplex frame or in an ATM cell stream, the transmission of signals from the subscriber-end network termination units to the associated connection unit proceeding respectively in a time slot, assigned to the respective subscriber-end network termination unit, of the multiplex frame, this transmission proceeding with adaptive control of the timing of the time slot using a TDMA method or by ATM cells using a TDMA method;

determining, for securing data, the public key in each case from a secret key prescribed in the subscriber-end network termination unit, said public key being upwardly transferred to the connection unit where it is used to encrypt information for matching the subscriber-end network termination unit to repeatedly changed transmission modalities which are provided individually for this subscriber-end network termination unit in the connection unit.

2. The method as claimed in claim 1, wherein at least one of an initial position and structure of scramblers which are provided in the higher level connection unit and which are assigned to the individual subscriber-end network termination units and of descramblers which are provided in the subscriber-end network termination units is repeatedly changed at a start of a frame in that the higher level connection unit determines, by a random number generator, in each case at least one of a random new initial position and structure for the scramblers assigned to the individual subscriber-end network termination units and communicates at least one of an associated initial position and structure of an associated descrambler, having been encrypted using a public key transferred by the respective subscriber-end network termination unit, to the respective subscriber-end network termination unit which decrypts this communication using the associated secret key, after which change is carried out starting from a specific frame.

3. The method as claimed in claim 2, wherein the subscriber-end network termination unit transfers, after a specific number of frames, a new public key, calculated by said network termination unit, to the higher level connection unit which, after at least one of a new scrambler initial position and structure has been determined, and at least one of the respectively associated descrambler initial position and structure of each subscriber-end network termination unit has been encrypted again, in turn individually communicates the change in at least one of the initial position and structure which is then carried out starting from a specific frame.

4. The method as claimed in claim 1, wherein assignment of time slots to the individual subscriber-end network termination units in a multiplex frame is repeatedly changed in that the higher level connection unit determines, by a random number generator, a random new time slot assignment for the individual subscriber-end network termination units and communicates the timing of the time slot or slots assigned to one of the network termination units, having been encrypted using a public key transferred by the respective subscriber-end network termination unit, to the respective subscriber-end network termination unit which decrypts this communication using the associated secret key, after which change is carried out starting from a specific multiplex frame.

5. The method as claimed in claim 4, wherein the subscriber-end network termination unit transfers, after a specific number of multiplex frames, a new public key, calculated by said network termination unit, to the higher level connection unit which, after a new time slot assignment to the subscriber-end network termination units has been determined and the respective time slot position has been encrypted again, in turn individually communicates to each subscriber-end network termination unit a reordering of the time slot assignment which is then carried out starting from a specific multiplex frame.

6. The method as claimed in claim 1, wherein assignment of addresses to individual subscriber-end network termination units is repeatedly changed in that the higher level connection unit determines, by a random number generator, a random new address assignment for the individual subscriber-end network termination units and communicates the respective new address information, having been encrypted using a public key transferred by the respective subscriber-end network termination unit, to the respective subscriber-end network termination unit which decrypts this communication using the associated secret key, after which change is taken into account starting from a specific multiplex frame.

7. The method as claimed in claim 6, wherein the subscriber-end network termination unit transfers, after a specific number of multiplex frames, a new public key, calculated by said network termination unit, to the higher level connection unit which, after a new address assignment to the subscriber-end network termination units has been determined and the respective address information has been encrypted again, in turn individually communicates to each subscriber-end network termination unit the new address assignment which is then taken into account starting from a specific multiplex frame.

8. The method as claimed in claim 1, wherein the transmission modalities for one of various subscriber-end network termination units and groups of subscriber-end network termination units are changed at various times.

* * * * *